US008872646B2

(12) United States Patent
Kahn et al.

(10) Patent No.: US 8,872,646 B2
(45) Date of Patent: Oct. 28, 2014

(54) METHOD AND SYSTEM FOR WAKING UP A DEVICE DUE TO MOTION

(75) Inventors: Philippe Kahn, Santa Cruz, CA (US); Arthur Kinsolving, Santa Cruz, CA (US); David Vogel, Santa Cruz, CA (US); Mark Andrew Christensen, Santa Cruz, CA (US)

(73) Assignee: DP Technologies, Inc., Scotts Valley, CA (US)

( * ) Notice: Subject to any disclaimer, the term of this patent is extended or adjusted under 35 U.S.C. 154(b) by 551 days.

(21) Appl. No.: 12/247,950

(22) Filed: Oct. 8, 2008

(65) Prior Publication Data

US 2010/0085203 A1  Apr. 8, 2010

(51) Int. Cl.
*B60Q 1/00* (2006.01)

(52) U.S. Cl.
USPC ........................................ 340/457; 340/573.1

(58) Field of Classification Search
USPC ........ 340/669, 457, 573.1, 686.1, 539.1, 522, 340/667; 702/141; 345/325, 156
IPC ..................................... G01C 1/00; G06F 1/00
See application file for complete search history.

(56) References Cited

U.S. PATENT DOCUMENTS

| | | | |
|---|---|---|---|
| 4,285,041 A | 8/1981 | Smith | |
| 4,571,680 A | 2/1986 | Wu | |
| 4,578,769 A | 3/1986 | Frederick | |
| 4,700,369 A | 10/1987 | Seigal et al. | |
| 4,776,323 A | 10/1988 | Spector | |
| 5,313,060 A | 5/1994 | Gast et al. | |
| 5,386,210 A | 1/1995 | Lee | |
| 5,430,480 A | 7/1995 | Allen et al. | |
| 5,446,725 A | 8/1995 | Ishiwatari | |
| 5,446,775 A | 8/1995 | Wright et al. | |
| 5,454,114 A | 9/1995 | Yach et al. | |
| 5,485,402 A | 1/1996 | Smith et al. | |
| 5,506,987 A | 4/1996 | Abramson et al. | |
| 5,515,419 A | 5/1996 | Sheffer | |
| 5,583,776 A | 12/1996 | Levi et al. | |
| 5,593,431 A | 1/1997 | Sheldon | |
| 5,654,619 A | 8/1997 | Iwashita | |

(Continued)

FOREIGN PATENT DOCUMENTS

| | | |
|---|---|---|
| EP | 1 104 143 | 5/2001 |
| EP | 0 833 537 | 7/2002 |

(Continued)

OTHER PUBLICATIONS

Ang, Wei Tech, et al, "Zero Phase Filtering for Active Compensation of Periodic Physiological Motion," Proc 1st IEEE / RAS-EMBS International Conference on Biomedical Robotics and Biomechatronics, Feb. 20-22, 2006, pp. 182-187.

(Continued)

*Primary Examiner* — Shirley Lu
(74) *Attorney, Agent, or Firm* — HIPLegal LLP; Judith A. Szepesi (57) ABSTRACT

A method comprises determining an idle sample value for a dominant axis of a device in an idle state. The method further comprises registering a motion of the device, and evaluating the motion. The method further comprises waking up the device when the analysis of the motion indicates a change in the dominant axis of the device and/or a level of acceleration beyond a threshold.

22 Claims, 7 Drawing Sheets

(56) References Cited

U.S. PATENT DOCUMENTS

| | | |
|---|---|---|
| 5,737,439 A | 4/1998 | Lapsley et al. |
| 5,771,001 A | 6/1998 | Cobb |
| 5,778,882 A | 7/1998 | Raymond et al. |
| 5,911,065 A | 6/1999 | Williams et al. |
| 5,955,667 A | 9/1999 | Fyfe |
| 5,960,085 A | 9/1999 | de la Huerga |
| 5,976,083 A | 11/1999 | Richardson et al. |
| 6,013,007 A | 1/2000 | Root et al. |
| 6,061,456 A | 5/2000 | Andrea et al. |
| 6,122,595 A | 9/2000 | Varley et al. |
| 6,129,686 A | 10/2000 | Friedman |
| 6,135,951 A | 10/2000 | Richardson et al. |
| 6,145,389 A | 11/2000 | Ebeling et al. |
| 6,246,321 B1 | 6/2001 | Rechsteiner et al. |
| 6,282,496 B1 | 8/2001 | Chowdhary |
| 6,353,449 B1 * | 3/2002 | Gregg et al. ................. 715/762 |
| 6,369,794 B1 | 4/2002 | Sakurai et al. |
| 6,396,883 B2 | 5/2002 | Yang et al. |
| 6,408,330 B1 | 6/2002 | DeLaHuerga |
| 6,428,490 B1 | 8/2002 | Kramer et al. |
| 6,470,147 B1 | 10/2002 | Imada |
| 6,478,736 B1 | 11/2002 | Mault |
| 6,493,652 B1 | 12/2002 | Ohlenbusch et al. |
| 6,496,695 B1 | 12/2002 | Kouji et al. |
| 6,513,381 B2 | 2/2003 | Fyfe et al. |
| 6,522,266 B1 | 2/2003 | Soehren et al. |
| 6,529,144 B1 | 3/2003 | Nilsen et al. |
| 6,532,419 B1 | 3/2003 | Begin et al. |
| 6,539,336 B1 | 3/2003 | Vock et al. |
| 6,595,929 B2 | 7/2003 | Stivoric et al. |
| 6,607,493 B2 | 8/2003 | Song |
| 6,611,789 B1 | 8/2003 | Darley |
| 6,628,898 B2 | 9/2003 | Endo |
| 6,634,992 B1 | 10/2003 | Ogawa |
| 6,665,802 B1 | 12/2003 | Ober |
| 6,672,991 B2 | 1/2004 | O'Malley |
| 6,685,480 B2 | 2/2004 | Nishimoto et al. |
| 6,700,499 B2 | 3/2004 | Kubo et al. |
| 6,731,958 B1 | 5/2004 | Shirai |
| 6,766,176 B1 | 7/2004 | Gupta et al. |
| 6,771,250 B1 * | 8/2004 | Oh ................................. 345/156 |
| 6,786,877 B2 | 9/2004 | Foxlin |
| 6,788,980 B1 | 9/2004 | Johnson |
| 6,790,178 B1 | 9/2004 | Mault et al. |
| 6,813,582 B2 | 11/2004 | Levi et al. |
| 6,823,036 B1 | 11/2004 | Chen |
| 6,826,477 B2 | 11/2004 | Ladetto et al. |
| 6,836,744 B1 | 12/2004 | Asphahani et al. |
| 6,881,191 B2 | 4/2005 | Oakley et al. |
| 6,885,971 B2 | 4/2005 | Vock et al. |
| 6,895,425 B1 | 5/2005 | Kadyk et al. |
| 6,898,550 B1 | 5/2005 | Blackadar et al. |
| 6,928,382 B2 | 8/2005 | Hong et al. |
| 6,941,239 B2 | 9/2005 | Unuma et al. |
| 6,959,259 B2 | 10/2005 | Vock et al. |
| 6,975,959 B2 | 12/2005 | Dietrich et al. |
| 7,002,553 B2 | 2/2006 | Shkolnikov |
| 7,010,332 B1 | 3/2006 | Irvin et al. |
| 7,020,487 B2 | 3/2006 | Kimata |
| 7,027,087 B2 | 4/2006 | Nozaki et al. |
| 7,028,547 B2 | 4/2006 | Shiratori et al. |
| 7,042,509 B2 | 5/2006 | Onuki |
| 7,054,784 B2 | 5/2006 | Flentov et al. |
| 7,057,551 B1 | 6/2006 | Vogt |
| 7,072,789 B2 | 7/2006 | Vock et al. |
| 7,092,846 B2 | 8/2006 | Vock et al. |
| 7,096,619 B2 | 8/2006 | Jackson et al. |
| 7,148,797 B2 | 12/2006 | Albert |
| 7,148,879 B2 | 12/2006 | Amento et al. |
| 7,149,964 B1 | 12/2006 | Cottrille et al. |
| 7,155,507 B2 | 12/2006 | Hirano et al. |
| 7,158,912 B2 | 1/2007 | Vock et al. |
| 7,169,084 B2 | 1/2007 | Tsuji |
| 7,171,222 B2 | 1/2007 | Fostick |
| 7,171,331 B2 | 1/2007 | Vock et al. |
| 7,173,604 B2 | 2/2007 | Marvit et al. |
| 7,176,886 B2 | 2/2007 | Marvit et al. |
| 7,176,887 B2 | 2/2007 | Marvit et al. |
| 7,176,888 B2 | 2/2007 | Marvit et al. |
| 7,177,684 B1 | 2/2007 | Kroll et al. |
| 7,180,500 B2 | 2/2007 | Marvit et al. |
| 7,180,501 B2 | 2/2007 | Marvit et al. |
| 7,180,502 B2 | 2/2007 | Marvit et al. |
| 7,212,230 B2 | 5/2007 | Stavely |
| 7,212,943 B2 | 5/2007 | Aoshima et |
| 7,220,220 B2 | 5/2007 | Stubbs et al. |
| 7,245,725 B1 | 7/2007 | Beard |
| 7,254,516 B2 | 8/2007 | Case et al. |
| 7,280,096 B2 | 10/2007 | Marvit et al. |
| 7,297,088 B2 | 11/2007 | Tsuji |
| 7,301,526 B2 | 11/2007 | Marvit et al. |
| 7,301,527 B2 | 11/2007 | Marvit et al. |
| 7,301,528 B2 | 11/2007 | Marvit et al. |
| 7,301,529 B2 | 11/2007 | Marvit et al. |
| 7,305,323 B2 | 12/2007 | Skvortsov et al. |
| 7,334,472 B2 | 2/2008 | Seo et al. |
| 7,343,260 B1 | 3/2008 | Kahn |
| 7,353,112 B2 | 4/2008 | Choi et al. |
| 7,365,735 B2 | 4/2008 | Reinhardt et al. |
| 7,365,736 B2 | 4/2008 | Marvit et al. |
| 7,365,737 B2 | 4/2008 | Marvit et al. |
| 7,379,999 B1 | 5/2008 | Zhou et al. |
| 7,382,611 B2 | 6/2008 | Tracy et al. |
| 7,387,611 B2 | 6/2008 | Inoue et al. |
| 7,397,357 B2 | 7/2008 | Krumm et al. |
| 7,428,471 B2 | 9/2008 | Darley et al. |
| 7,451,056 B2 | 11/2008 | Flentov et al. |
| 7,457,719 B1 | 11/2008 | Kahn et al. |
| 7,457,872 B2 | 11/2008 | Aton et al. |
| 7,463,997 B2 | 12/2008 | Pasolini et al. |
| 7,467,060 B2 | 12/2008 | Kulach et al. |
| 7,489,937 B2 | 2/2009 | Chung et al. |
| 7,502,643 B2 | 3/2009 | Farringdon et al. |
| 7,512,515 B2 | 3/2009 | Vock et al. |
| 7,526,402 B2 | 4/2009 | Tanenhaus et al. |
| 7,608,050 B2 | 10/2009 | Sugg |
| 7,617,071 B2 | 11/2009 | Darley et al. |
| 7,640,134 B2 | 12/2009 | Park et al. |
| 7,640,804 B2 | 1/2010 | Daumer et al. |
| 7,647,195 B1 | 1/2010 | Kahn |
| 7,647,196 B2 | 1/2010 | Kahn et al. |
| 7,653,508 B1 | 1/2010 | Kahn |
| 7,664,657 B1 | 2/2010 | Letzt et al. |
| 7,689,107 B2 | 3/2010 | Enomoto |
| 7,705,884 B2 | 4/2010 | Pinto et al. |
| 7,752,011 B2 | 7/2010 | Niva et al. |
| 7,753,861 B1 | 7/2010 | Kahn et al. |
| 7,765,553 B2 | 7/2010 | Douceur et al. |
| 7,774,156 B2 | 8/2010 | Niva et al. |
| 7,788,059 B1 | 8/2010 | Kahn et al. |
| 7,857,772 B2 | 12/2010 | Bouvier et al. |
| 7,881,902 B1 | 2/2011 | Kahn |
| 7,889,085 B2 | 2/2011 | Downey et al. |
| 7,892,080 B1 | 2/2011 | Dahl |
| 7,917,768 B2 | 3/2011 | Kahn |
| 7,962,312 B2 | 6/2011 | Darley et al. |
| 7,987,070 B2 | 7/2011 | Kahn |
| 8,140,115 B1 | 3/2012 | Kahn |
| 8,187,182 B2 | 5/2012 | Kahn |
| 8,275,635 B2 | 9/2012 | Stivoric et al. |
| 8,285,344 B2 | 10/2012 | Kahn |
| 8,320,578 B2 | 11/2012 | Kahn |
| 8,398,546 B2 | 3/2013 | Pacione et al. |
| 8,555,282 B1 | 10/2013 | Kahn |
| 8,568,310 B2 | 10/2013 | Kahn |
| 8,725,527 B1 | 5/2014 | Kahn |
| 2001/0047488 A1 | 11/2001 | Verplaetse et al. |
| 2002/0006284 A1 | 1/2002 | Kim |
| 2002/0023654 A1 | 2/2002 | Webb |
| 2002/0027164 A1 | 3/2002 | Mault et al. |
| 2002/0042830 A1 | 4/2002 | Bose et al. |
| 2002/0044634 A1 | 4/2002 | Rooke et al. |
| 2002/0054214 A1 | 5/2002 | Yoshikawa |
| 2002/0089425 A1 | 7/2002 | Kubo et al. |

(56) References Cited

U.S. PATENT DOCUMENTS

| | | |
|---|---|---|
| 2002/0109600 A1 | 8/2002 | Mault et al. |
| 2002/0118121 A1 | 8/2002 | Lehrman et al. |
| 2002/0122543 A1 | 9/2002 | Rowen |
| 2002/0138017 A1 | 9/2002 | Bui et al. |
| 2002/0142887 A1 | 10/2002 | O'Malley |
| 2002/0150302 A1 | 10/2002 | McCarthy et al. |
| 2002/0151810 A1 | 10/2002 | Wong et al. |
| 2002/0173295 A1 | 11/2002 | Nykanen et al. |
| 2002/0190947 A1 | 12/2002 | Feinstein |
| 2002/0193124 A1 | 12/2002 | Hamilton et al. |
| 2003/0018430 A1 | 1/2003 | Ladetto et al. |
| 2003/0033411 A1 | 2/2003 | Kavoori et al. |
| 2003/0048218 A1 | 3/2003 | Milnes et al. |
| 2003/0083596 A1 | 5/2003 | Kramer et al. |
| 2003/0093187 A1 | 5/2003 | Walker |
| 2003/0101260 A1 | 5/2003 | Dacier et al. |
| 2003/0109258 A1 | 6/2003 | Mantyjarvi et al. |
| 2003/0139692 A1 | 7/2003 | Barrey et al. |
| 2003/0139908 A1 | 7/2003 | Wegerich et al. |
| 2003/0149526 A1 | 8/2003 | Zhou et al. |
| 2003/0151672 A1 | 8/2003 | Robins et al. |
| 2003/0187683 A1 | 10/2003 | Kirchhoff et al. |
| 2003/0208110 A1 | 11/2003 | Mault et al. |
| 2003/0208113 A1 | 11/2003 | Mault et al. |
| 2003/0227487 A1 | 12/2003 | Hugh |
| 2003/0236625 A1 | 12/2003 | Brown et al. |
| 2004/0017300 A1 | 1/2004 | Kotzin et al. |
| 2004/0024846 A1 | 2/2004 | Randall et al. |
| 2004/0043760 A1 | 3/2004 | Rosenfeld et al. |
| 2004/0044493 A1 | 3/2004 | Coulthard |
| 2004/0047498 A1 | 3/2004 | Mulet-Parada et al. |
| 2004/0078219 A1 | 4/2004 | Kaylor et al. |
| 2004/0078220 A1 | 4/2004 | Jackson |
| 2004/0081441 A1 | 4/2004 | Sato et al. |
| 2004/0106421 A1 | 6/2004 | Tomiyoshi et al. |
| 2004/0106958 A1 | 6/2004 | Mathis et al. |
| 2004/0122294 A1 | 6/2004 | Hatlestad et al. |
| 2004/0122295 A1 | 6/2004 | Hatlestad et al. |
| 2004/0122296 A1 | 6/2004 | Hatlestad et al. |
| 2004/0122297 A1 | 6/2004 | Stahmann et al. |
| 2004/0122333 A1 | 6/2004 | Nissila |
| 2004/0122484 A1 | 6/2004 | Hatlestad et al. |
| 2004/0122485 A1 | 6/2004 | Stahmann et al. |
| 2004/0122486 A1 | 6/2004 | Stahmann et al. |
| 2004/0122487 A1 | 6/2004 | Hatlestad et al. |
| 2004/0125073 A1 | 7/2004 | Potter et al. |
| 2004/0130628 A1 | 7/2004 | Stavely |
| 2004/0135898 A1 | 7/2004 | Zador |
| 2004/0146048 A1 | 7/2004 | Cotte |
| 2004/0148340 A1 | 7/2004 | Cotte |
| 2004/0148341 A1 | 7/2004 | Cotte |
| 2004/0148342 A1 | 7/2004 | Cotte |
| 2004/0148351 A1 | 7/2004 | Cotte |
| 2004/0172167 A1 | 9/2004 | Pasolini et al. |
| 2004/0176067 A1 | 9/2004 | Lakhani et al. |
| 2004/0185821 A1 | 9/2004 | Yuasa |
| 2004/0219910 A1 | 11/2004 | Beckers |
| 2004/0225467 A1 | 11/2004 | Vock et al. |
| 2004/0236500 A1 | 11/2004 | Choi et al. |
| 2004/0242202 A1 | 12/2004 | Torvinen |
| 2004/0247030 A1 | 12/2004 | Wiethoff |
| 2004/0259494 A1 | 12/2004 | Mazar |
| 2005/0015768 A1 | 1/2005 | Moore |
| 2005/0027567 A1 | 2/2005 | Taha |
| 2005/0033200 A1 | 2/2005 | Soehren et al. |
| 2005/0038691 A1 | 2/2005 | Babu |
| 2005/0048945 A1 | 3/2005 | Porter |
| 2005/0048955 A1 | 3/2005 | Ring |
| 2005/0078197 A1 | 4/2005 | Gonzales |
| 2005/0079873 A1 | 4/2005 | Caspi et al. |
| 2005/0101841 A9 | 5/2005 | Kaylor et al. |
| 2005/0102167 A1 | 5/2005 | Kapoor |
| 2005/0107944 A1 | 5/2005 | Hovestadt et al. |
| 2005/0113649 A1 | 5/2005 | Bergantino |
| 2005/0113650 A1 | 5/2005 | Pacione et al. |
| 2005/0131736 A1 | 6/2005 | Nelson et al. |
| 2005/0141522 A1 | 6/2005 | Kadar et al. |
| 2005/0143106 A1 | 6/2005 | Chan et al. |
| 2005/0146431 A1 | 7/2005 | Hastings et al. |
| 2005/0157181 A1 | 7/2005 | Kawahara et al. |
| 2005/0165719 A1 | 7/2005 | Greenspan et al. |
| 2005/0168587 A1 | 8/2005 | Sato et al. |
| 2005/0182824 A1 | 8/2005 | Cotte |
| 2005/0183086 A1 | 8/2005 | Abe et al. |
| 2005/0202934 A1 | 9/2005 | Olrik et al. |
| 2005/0203430 A1 | 9/2005 | Williams et al. |
| 2005/0210300 A1 | 9/2005 | Song et al. |
| 2005/0212751 A1 | 9/2005 | Marvit et al. |
| 2005/0212752 A1 | 9/2005 | Marvit et al. |
| 2005/0212753 A1 | 9/2005 | Marvit et al. |
| 2005/0212760 A1 | 9/2005 | Marvit et al. |
| 2005/0216403 A1 | 9/2005 | Tam et al. |
| 2005/0222801 A1 | 10/2005 | Wulff et al. |
| 2005/0232388 A1 | 10/2005 | Tsuji |
| 2005/0232404 A1 | 10/2005 | Gaskill |
| 2005/0234676 A1 | 10/2005 | Shibayama |
| 2005/0235058 A1 | 10/2005 | Rackus et al. |
| 2005/0238132 A1 | 10/2005 | Tsuji |
| 2005/0240375 A1 | 10/2005 | Sugai |
| 2005/0243178 A1 | 11/2005 | McConica |
| 2005/0245988 A1 | 11/2005 | Miesel |
| 2005/0248718 A1 | 11/2005 | Howell et al. |
| 2005/0256414 A1 | 11/2005 | Kettunen et al. |
| 2005/0258938 A1 | 11/2005 | Moulson |
| 2005/0262237 A1 | 11/2005 | Fulton et al. |
| 2005/0281289 A1 | 12/2005 | Huang et al. |
| 2006/0009243 A1 | 1/2006 | Dahan et al. |
| 2006/0017692 A1 | 1/2006 | Wehrenberg et al. |
| 2006/0020177 A1 | 1/2006 | Seo et al. |
| 2006/0029284 A1 | 2/2006 | Stewart |
| 2006/0063980 A1 | 3/2006 | Hwang et al. |
| 2006/0064276 A1 | 3/2006 | Ren et al. |
| 2006/0080551 A1 | 4/2006 | Mantyjarvi et al. |
| 2006/0090088 A1 | 4/2006 | Choi et al. |
| 2006/0090161 A1 | 4/2006 | Bodas et al. |
| 2006/0098097 A1 | 5/2006 | Wach et al. |
| 2006/0100546 A1 | 5/2006 | Silk |
| 2006/0109113 A1 | 5/2006 | Reyes et al. |
| 2006/0136173 A1 | 6/2006 | Case, Jr. et al. |
| 2006/0149516 A1 | 7/2006 | Bond et al. |
| 2006/0154642 A1 | 7/2006 | Scannell, Jr. |
| 2006/0161377 A1* | 7/2006 | Rakkola et al. ............... 702/141 |
| 2006/0161459 A9 | 7/2006 | Rosenfeld et al. |
| 2006/0167387 A1 | 7/2006 | Buchholz et al. |
| 2006/0167647 A1 | 7/2006 | Krumm et al. |
| 2006/0167943 A1 | 7/2006 | Rosenberg |
| 2006/0172706 A1 | 8/2006 | Griffin et al. |
| 2006/0174685 A1 | 8/2006 | Skvortsov et al. |
| 2006/0201964 A1 | 9/2006 | DiPerna et al. |
| 2006/0204214 A1 | 9/2006 | Shah et al. |
| 2006/0205406 A1 | 9/2006 | Pekonen et al. |
| 2006/0206258 A1 | 9/2006 | Brooks |
| 2006/0223547 A1 | 10/2006 | Chin et al. |
| 2006/0249683 A1 | 11/2006 | Goldberg et al. |
| 2006/0256082 A1 | 11/2006 | Cho et al. |
| 2006/0257042 A1 | 11/2006 | Ofek et al. |
| 2006/0259268 A1 | 11/2006 | Vock et al. |
| 2006/0288781 A1 | 12/2006 | Daumer et al. |
| 2006/0289819 A1 | 12/2006 | Parsons et al. |
| 2007/0004451 A1 | 1/2007 | Anderson |
| 2007/0005988 A1 | 1/2007 | Zhengyou et al. |
| 2007/0017136 A1 | 1/2007 | Mosher et al. |
| 2007/0024441 A1 | 2/2007 | Kahn et al. |
| 2007/0037605 A1 | 2/2007 | Logan et al. |
| 2007/0037610 A1 | 2/2007 | Logan |
| 2007/0038364 A1 | 2/2007 | Lee et al. |
| 2007/0040892 A1 | 2/2007 | Aoki et al. |
| 2007/0050157 A1 | 3/2007 | Kahn et al. |
| 2007/0061105 A1 | 3/2007 | Darley et al. |
| 2007/0063850 A1 | 3/2007 | Devaul et al. |
| 2007/0067094 A1 | 3/2007 | Park et al. |
| 2007/0073482 A1 | 3/2007 | Churchill et al. |
| 2007/0075127 A1 | 4/2007 | Rosenberg |
| 2007/0075965 A1 | 4/2007 | Huppi et al. |

(56) References Cited

U.S. PATENT DOCUMENTS

| | | |
|---|---|---|
| 2007/0078324 A1 | 4/2007 | Wijisiriwardana |
| 2007/0082789 A1 | 4/2007 | Nissila et al. |
| 2007/0102525 A1 | 5/2007 | Orr et al. |
| 2007/0104479 A1 | 5/2007 | Machida |
| 2007/0106991 A1 | 5/2007 | Yoo |
| 2007/0125852 A1 | 6/2007 | Rosenberg |
| 2007/0130582 A1 | 6/2007 | Chang et al. |
| 2007/0142715 A1 | 6/2007 | Banet et al. |
| 2007/0143068 A1 | 6/2007 | Pasolini et al. |
| 2007/0145680 A1 | 6/2007 | Rosenberg |
| 2007/0150136 A1* | 6/2007 | Doll et al. ............ 701/34 |
| 2007/0156364 A1 | 7/2007 | Rothkopf |
| 2007/0161410 A1 | 7/2007 | Huang et al. |
| 2007/0165790 A1 | 7/2007 | Taori |
| 2007/0169126 A1 | 7/2007 | Todoroki et al. |
| 2007/0176898 A1 | 8/2007 | Suh |
| 2007/0192483 A1 | 8/2007 | Rezvani et al. |
| 2007/0195784 A1 | 8/2007 | Allen et al. |
| 2007/0208531 A1 | 9/2007 | Darley et al. |
| 2007/0208544 A1 | 9/2007 | Kulach et al. |
| 2007/0213085 A1 | 9/2007 | Fedora |
| 2007/0213126 A1 | 9/2007 | Deutsch et al. |
| 2007/0233788 A1 | 10/2007 | Bender |
| 2007/0239399 A1 | 10/2007 | Sheynblat et al. |
| 2007/0250261 A1 | 10/2007 | Soehren |
| 2007/0259685 A1 | 11/2007 | Engblom et al. |
| 2007/0259716 A1* | 11/2007 | Mattice et al. .......... 463/36 |
| 2007/0259717 A1 | 11/2007 | Mattice et al. |
| 2007/0260418 A1 | 11/2007 | Ladetto et al. |
| 2007/0260482 A1 | 11/2007 | Nurmela et al. |
| 2007/0263995 A1 | 11/2007 | Park et al. |
| 2007/0296696 A1 | 12/2007 | Nurmi |
| 2008/0005738 A1 | 1/2008 | Imai et al. |
| 2008/0030586 A1 | 2/2008 | Helbing et al. |
| 2008/0046888 A1 | 2/2008 | Appaji |
| 2008/0052716 A1 | 2/2008 | Theurer |
| 2008/0072014 A1 | 3/2008 | Krishnan et al. |
| 2008/0102785 A1 | 5/2008 | Childress et al. |
| 2008/0113689 A1 | 5/2008 | Bailey |
| 2008/0140338 A1 | 6/2008 | No et al. |
| 2008/0153671 A1 | 6/2008 | Ogg et al. |
| 2008/0161072 A1 | 7/2008 | Lide et al. |
| 2008/0165022 A1 | 7/2008 | Herz et al. |
| 2008/0168361 A1 | 7/2008 | Forstall et al. |
| 2008/0171918 A1 | 7/2008 | Teller et al. |
| 2008/0214358 A1 | 9/2008 | Ogg et al. |
| 2008/0231713 A1 | 9/2008 | Florea et al. |
| 2008/0231714 A1 | 9/2008 | Estevez et al. |
| 2008/0232604 A1 | 9/2008 | Dufresne et al. |
| 2008/0243432 A1 | 10/2008 | Kato et al. |
| 2008/0303681 A1 | 12/2008 | Herz et al. |
| 2008/0311929 A1 | 12/2008 | Carro et al. |
| 2009/0017880 A1 | 1/2009 | Moore et al. |
| 2009/0031319 A1 | 1/2009 | Fecioru |
| 2009/0043531 A1 | 2/2009 | Kahn et al. |
| 2009/0047645 A1 | 2/2009 | Dibenedetto et al. |
| 2009/0067826 A1 | 3/2009 | Shinohara et al. |
| 2009/0082994 A1 | 3/2009 | Schuler et al. |
| 2009/0088204 A1 | 4/2009 | Culbert et al. |
| 2009/0098880 A1 | 4/2009 | Lindquist |
| 2009/0099668 A1 | 4/2009 | Lehman et al. |
| 2009/0124348 A1 | 5/2009 | Yoseloff et al. |
| 2009/0128448 A1 | 5/2009 | Riechel |
| 2009/0174782 A1 | 7/2009 | Kahn et al. |
| 2009/0213002 A1 | 8/2009 | Rani et al. |
| 2009/0215502 A1 | 8/2009 | Griffin, Jr. |
| 2009/0234614 A1 | 9/2009 | Kahn et al. |
| 2009/0274317 A1 | 11/2009 | Kahn et al. |
| 2009/0296951 A1 | 12/2009 | De Haan |
| 2009/0319221 A1 | 12/2009 | Kahn et al. |
| 2009/0325705 A1 | 12/2009 | Filer et al. |
| 2010/0056872 A1 | 3/2010 | Kahn et al. |
| 2010/0057398 A1 | 3/2010 | Darley et al. |
| 2010/0199189 A1 | 8/2010 | Ben-Aroya et al. |
| 2010/0245131 A1 | 9/2010 | Graumann |
| 2010/0277489 A1 | 11/2010 | Geisner et al. |
| 2010/0283742 A1 | 11/2010 | Lam |

FOREIGN PATENT DOCUMENTS

| | | |
|---|---|---|
| EP | 1271099 A2 | 1/2003 |
| GB | 2431813 A | 5/2007 |
| JP | 7020547 A | 1/1995 |
| JP | 2000-90069 | 3/2000 |
| JP | 2001-057695 | 2/2001 |
| JP | 2001-79699 | 3/2001 |
| JP | 2003-014459 | 1/2003 |
| JP | 2003-143683 | 5/2003 |
| JP | 2005-309691 A | 11/2005 |
| JP | 2006-026092 | 2/2006 |
| JP | 2006-118909 | 5/2006 |
| JP | 2006-239398 | 9/2006 |
| JP | 2007-080219 | 3/2007 |
| JP | 2007-093433 | 4/2007 |
| JP | 2007-104670 | 4/2007 |
| JP | 2007-142611 | 6/2007 |
| JP | 2007-206748 | 8/2007 |
| JP | 2007-215784 | 8/2007 |
| JP | 2007-226855 | 9/2007 |
| JP | 2008-173248 | 7/2008 |
| WO | WO 99/22338 | 5/1999 |
| WO | WO 00/63874 | 10/2000 |
| WO | WO 01/88477 A2 | 11/2001 |
| WO | WO 02/088926 | 11/2002 |
| WO | WO 2006/008790 | 7/2004 |

OTHER PUBLICATIONS

Lee, Hyunseok, et al, A Dual Processor Solution for the MAC Layer of a Software Defined Radio Terminal, Advanced Computer Architecture Laboratory, University of Michigan, 25 pages.

Weinberg, Harvey, "Minimizing Power Consumption of iMEMS® Accelerometers," Analog Devices, <http://www.analog.com/static/imported-files/application_notes/5935151853362884599AN601.pdf>, 2002, 5 pages.

Zypad WL 1100 Wearable Computer, <http://www.eurotech.fi/products/manuals/Zypad%20WL%201100_sf.pdf>, Jan. 16, 2008, 2 pgs.

The International Search Report and the Written Opinion, PCT/US2009/059900, mailing date Mar. 31, 2010, 9 pages.

Anderson, Ian, et al, "Shakra: Tracking and Sharing Daily Activity Levels with Unaugmented Mobile Phones," Mobile Netw Appl, Aug. 3, 2007, pp. 185-199.

Aylward, Ryan, et al, "Sensemble: A Wireless, Compact, Multi-User Sensor System for Interactive Dance," International Conference on New Interfaces for Musical Expression (NIME06), Jun. 4-8, 2006, pp. 134-139.

Baca, Arnold, et al, "Rapid Feedback Systems for Elite Sports Training," IEEE Pervasive Computing, Oct.-Dec. 2006, pp. 70-76.

Bakhru, Kesh, "A Seamless Tracking Solution for Indoor and Outdoor Position Location," IEEE 16th International Symposium on Personal, Indoor, and Mobile Radio Communications, 2005, pp. 2029-2033.

Bliley, Kara E, et al, "A Miniaturized Low Power Personal Motion Analysis Logger Utilizing Mems Accelerometers and Low Power Microcontroller," IEEE EMBS Special Topic Conference on Microtechnologies in Medicine and Biology, May 12-15, 2005, pp. 92-93.

Bourzac, Katherine, "Wearable Health Reports," Technology Review, Feb. 28, 2006, <http://www.techreview.com/printer_friendly_article_aspx?id+16431>, accessed Mar. 22, 2007, 3 pages.

Cheng, Fangxiang, et al, "Periodic Human Motion Description for Sports Video Databases," Proceedings of the Pattern Recognition, 2004, 5 pages.

Dao, Ricardo, "Inclination Sensing with Thermal Accelerometers", MEMSIC, May 2002, 3 pages.

Fang, Lei, et al, "Design of a Wireless Assisted Pedestrian Dead Reckoning System—The NavMote Experience," IEEE Transactions on Instrumentation and Measurement, vol. 54, No. 6, Dec. 2005, pp. 2342-2358.

(56) References Cited

OTHER PUBLICATIONS

Healey, Jennifer, et al, "Wearable Wellness Monitoring Using ECG and Accelerometer Data," IEEE Int. Symposium on Wearable Computers (ISWC'05), 2005, 2 pages.

Hemmes, Jeffrey, et al, "Lessons Learned Building TeamTrak: An Urban/Outdoor Mobile Testbed," 2007 IEEE Int. Conf. on Wireless Algorithms, Aug. 1-3, 2007, pp. 219-224.

Jones, L, et al, "Wireless Physiological Sensor System for Ambulatory Use," <http://ieeexplore.ieee.org/xpl/freeabs_all.jsp?tp=&arnumber=1612917&isnumber=33861>, Apr. 3-5, 2006.

Jovanov, Emil, et al, "A Wireless Body Area Network of Intelligent Motion Sensors for Computer Assisted Physical Rehabilitation," Journal of NeuroEngineering and Rehabilitation, Mar. 2005, 10 pages.

Kalpaxis, Alex, "Wireless Temporal-Spatial Human Mobility Analysis Using Real-Time Three Dimensional Acceleration Data," IEEE Intl. Multi-Conf. on Computing in Global IT (ICCGI'07), 2007, 7 pages.

Lee, Seon-Woo, et al., "Recognition of Walking Behaviors for Pedestrian Navigation," IEEE International Conference on Control Applications, Sep. 5-7, 2001, pp. 1152-1155.

Margaria, Rodolfo, "Biomechanics and Energetics of Muscular Exercise", Chapter 3, Oxford: Clarendon Press, 1976, pp. 105-125.

Milenkovic, Milena, et al, "An Accelerometer-Based Physical Rehabilitation System," IEEE SouthEastern Symposium on System Theory, 2002, pp. 57-60.

Mizell, David, "Using Gravity to Estimate Accelerometer Orientation", Seventh IEEE International Symposium on Wearable Computers, 2003, 2 pages.

Ormoneit, D, et al, "Learning and Tracking Cyclic Human Motion," 7 pages.

Otto, Chris, et al, "System Architecture of a Wireless Body Area Sensor Network for Ubiquitous Health Monitoring," Journal of Mobile Multimedia, vol. 1, No. 4, 2006, pp. 307-326.

Park, Chulsung, et al, "Eco: An Ultra-Compact Low-Power Wireless Sensor Node for Real-Time Motion Monitoring," IEEE Int. Symp. on Information Processing in Sensor Networks, 2005, pp. 398-403.

Shen, Chien-Lung, et al, "Wearable Band Using a Fabric-Based Sensor for Exercise ECG Monitoring," IEEE Int. Symp. on Wearable Computers, 2006, 2 pages.

"Sensor Fusion," <www.u-dynamics.com>, accessed Aug. 29, 2008, 2 pages.

Tapia, Emmanuel Munguia, et al, "Real-Time Recognition of Physical Activities and Their Intensities Using Wireless Accelerometers and a Heart Rate Monitor," IEEE Cont. on Wearable Computers, Oct. 2007, 4 pages.

Wang, Shu, et al, "Location Based Services for Mobiles: Technologies and Standards, LG Electronics MobileComm," IEEE ICC 2008, Beijing, pp. 1-66 (part 1 of 3).

Wang, Shu, et al, "Location Based Services for Mobiles: Technologies and Standards, LG Electronics MobileComm," IEEE ICC 2008, Beijing, pp. 67-92 (part 2 of 3).

Wang, Shu, et al, "Location Based Services for Mobiles: Technologies and Standards, LG Electronics MobileComm," IEEE ICC 2008, Beijing, pp. 93-123 (part 3 of 3).

Weckesser, P, et al, "Multiple Sensorprocessing for High-Precision Navigation and Environmental Modeling with a Mobile Robot," IEEE, 1995, pp. 453-458.

Weinberg, Harvey, "MEMSs Motion Sensors Boost Handset Reliability," <http://www.mwrf.com/Articles/Print.cfm?ArticleID=12740>, Jun. 2006, 3 pages.

Wixted, Andrew J, et al, "Measurement of Energy Expenditure in Elite Athletes Using MEMS-Based Triaxial Accelerometers," IEEE Sensors Journal, vol. 7, No. 4, Apr. 2007, pp. 481-488.

Wu, Winston H, et al, "Context-Aware Sensing of Physiological Signals," IEEE Int. Conf. on Engineering for Medicine and Biology, Aug. 23-26, 2007, pp. 5271-5275.

Yoo, Chang-Sun, et al, "Low Cost GPS/INS Sensor Fusion System for UAV Navigation," IEEE Digital Avionics Systems Conference (DASC '03), 2003, 9 pages.

"Heart Rate Monitor Sports Bra," <www.numetrex.com/about/heart-rate-monitor-sports-bra>, Accessed Aug. 9, 2013, 2 pages.

"Smart Underwear With Biosensors Availability in the Market Kudos to Modern Inkjet Printer Technology," <www.kokeytechnology.com/biotechnology/smart-underwear-with-biosensors-availability-in-the-market-kudos-to-modern-inkjet-printer-technology/>, Published Jul. 21, 2010, 2 pages.

Mein Hold, Bridgette, "Adidas by Stella McCartney's Tennis Bra Includes Built-In Heart Sensor," <www.ecouterre.com/adidas-by-stella-mccartneys-tennis-bra-includes-built-in-heart-sensor/>, Mar. 23, 2012, 2 pages.

European Patent Application No. EP09819844.3, Office Action, Dated Oct. 11, 2013, 6 pages.

Japanese Patent Application No. 2011-531156, Notification of Reasons for Rejection, Dispatched Dec. 2, 2013, 6 pages.

European Patent Application No. EP09819844.3, Supplementary European Search Report, Dated Jun. 5, 2012, 10 pages.

\* cited by examiner

METHOD AND SYSTEM FOR WAKING UP A DEVICE DUE TO MOTION

FIELD OF THE INVENTION

This invention relates to a method and system for waking up a device from an idle state.

BACKGROUND

Technological progress has led to the proliferation of commercial electronic devices such as portable computers, game controllers, GPS devices, digital cameras, cellular telephones, and personal media players. Continuous improvements have allowed the users to enjoy many features and possible uses from a single mobile device. However, generally, the more applications a mobile device has, the faster the battery of the mobile device depletes. Therefore, it can be difficult to maximize battery life and provide a great user experience at the same time.

SUMMARY OF THE INVENTION

The present invention provides a method and system to wake up a device due to motion. The system determines a dominant axis of a device. The device is placed in an idle state, after a period of inactivity or lack of motion. A sensor, such as an accelerometer, registers a motion of the device. A computation logic analyzes the motion data to determine if the motion data indicates a real motion. If so, the device is woken up.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and system for waking up a device due to motion of the device is described. Embodiments of the present invention are designed to determine if a device should be woken up from an idle state based on the analysis of motion data. In one embodiment, motion data for the dominant axis is analyzed and the device is woken up from idle state if the motion data analysis points to the motion being "real" motion as opposed to a mere jostle or glitch.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1:
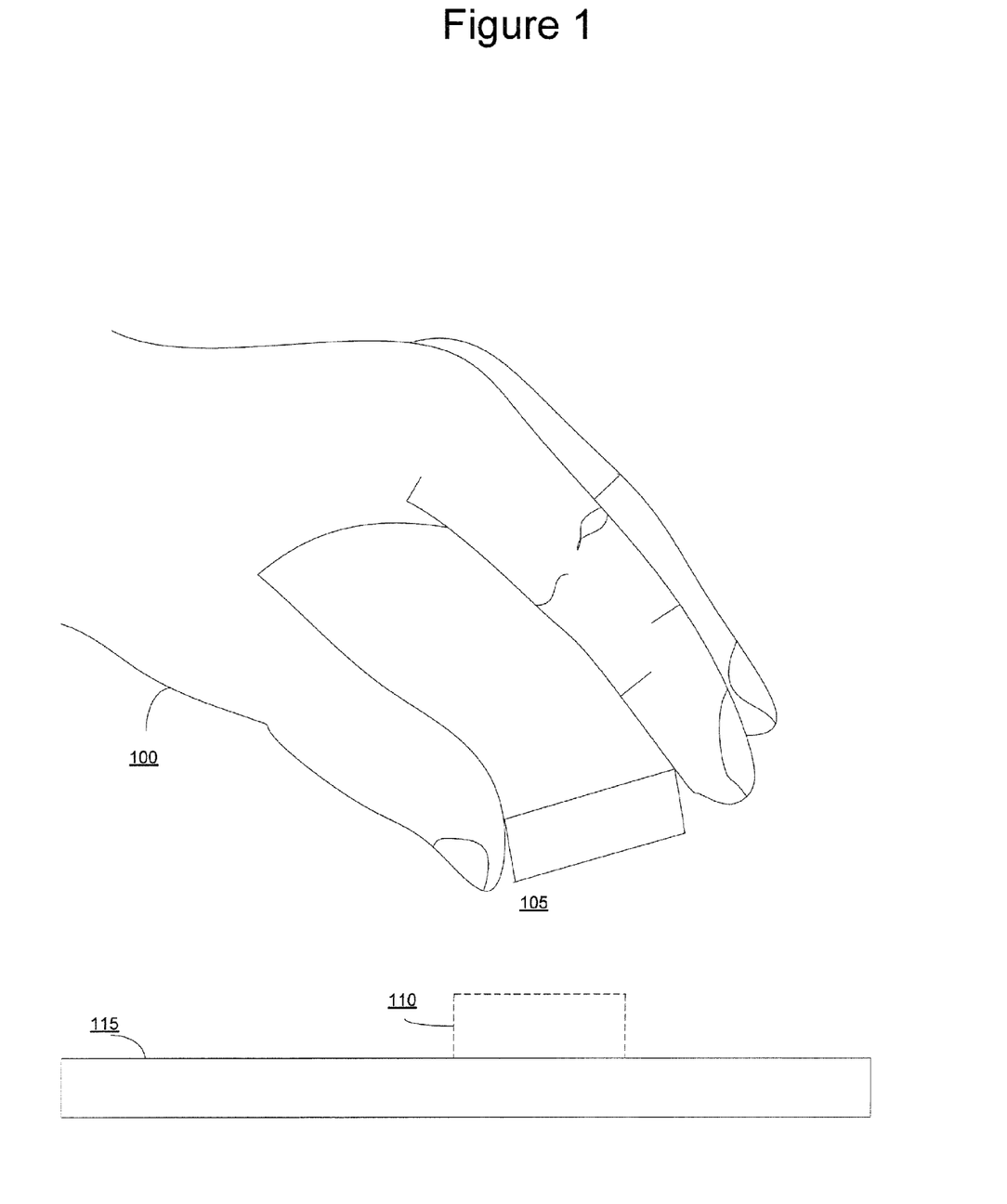
FIG. 1 is an illustration of one embodiment of moving a device that may require waking up the device.

FIG. 1 is an illustration of one embodiment of moving an idle device that may result in waking up the device. The idle state is defined, in one embodiment, as a state in which the device is not moving, and there is no active application which includes user interaction/display. In one embodiment, there may be multiple levels of idle state, e.g. where various subsystems are placed in a power-reduced state or not. When the device is in the idle state, the device is placed in low-power mode. In this state, there is sufficient power maintained to monitor at least one sensor. However, other elements and applications are turned off to extend the battery life of the device. In one embodiment, some applications may remain active. For example, the device may be in the idle state, but continue a download, utilizing a network and memory store. In one embodiment, if at least one subsystem is turned off due to lack of device motion, this may be considered an "idle state."

In one embodiment, after a device 110 is placed on a horizontal surface 115 such as a desk or chair, after a period of inactivity the device 110 goes to the idle state to conserve the battery. In one embodiment, the device is placed into the pocket, purse, bag, or any other non-moving location, the device enters the idle state.

The system, in one embodiment, is designed to ensure that when the device is picked up by a user, the device is moved from the idle state to an active state rapidly. By initiating the transition from the idle state to the active state without requiring user input, the user wait is reduced. For example, when a user 100 picks up the device 110 from its position on the horizontal surface 115, the device is designed to wake up. In one embodiment, the device 110 is woken up from idle state and the user is presented the last active state of the device. In one embodiment, this may be sufficiently rapid that by the time the device is being viewed by the user, the prior state has been restored. In contrast, if the table on which the device is resting is shaken, or the purse is jostled, the device should not wake up. This reduces power usage, because the device is not continuously being woken up from small motions which occur when someone walks near a table, sits down, or similarly causes small motions.

Figure 2:
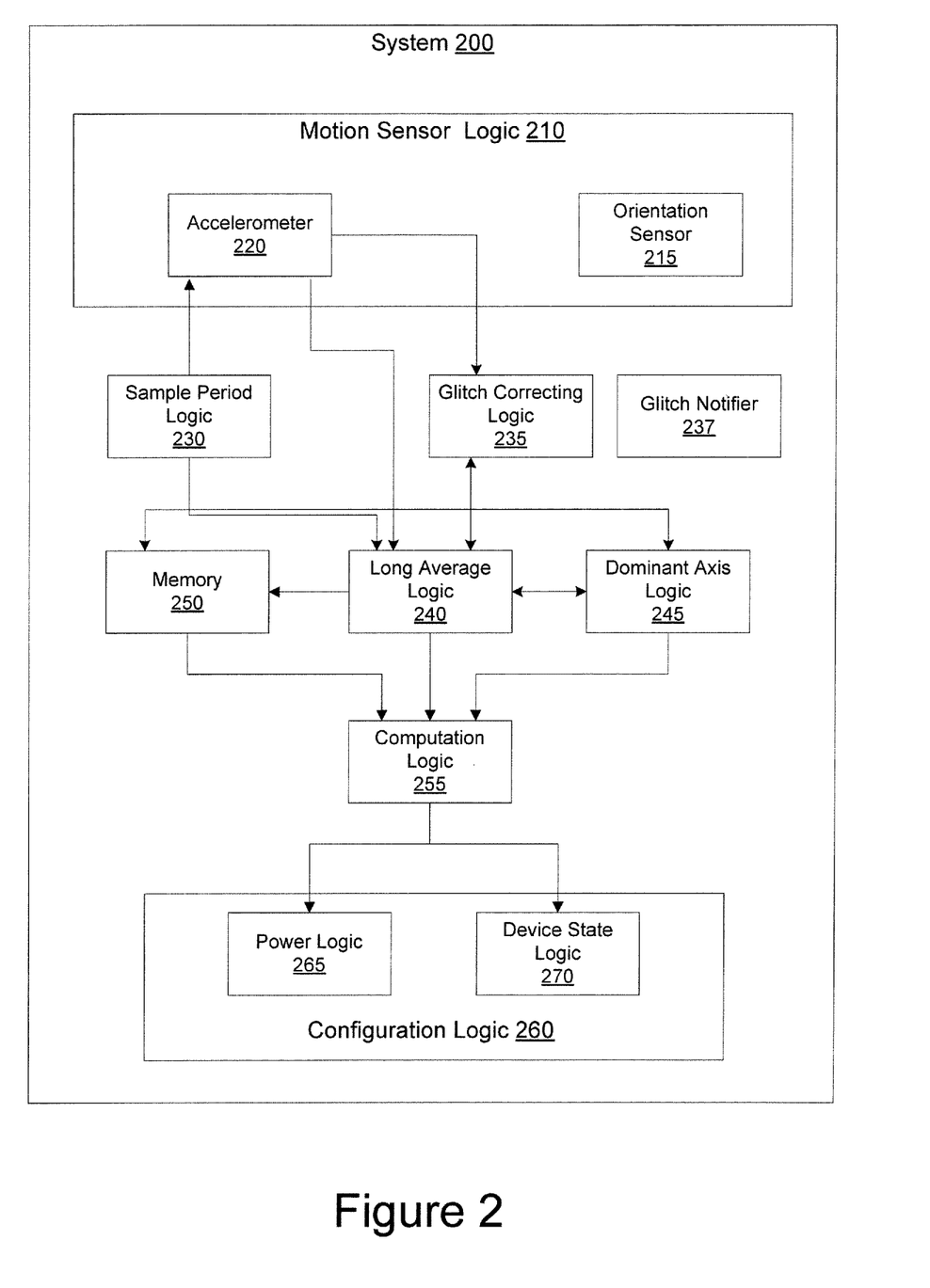
FIG. 2 is a block diagram of one embodiment of a system.

FIG. 2 is a block diagram illustrating one embodiment of a system 200 of the present invention. In one embodiment, the system 200 is a portable electronic device. The system 200 in one embodiment comprises motion sensor logic 210, sample period logic 230, glitch correcting logic 235, long average logic 240, dominant axis logic 245, memory 250, computation logic 255, and configuration logic 260.

In one embodiment, the motion sensor logic 210 comprises an accelerometer 220. In one embodiment, the motion sensor logic 210 also includes one or more additional sensors, such as orientation sensor 215.

In one embodiment, accelerometer 220 may be used to determine orientation of the device. The orientation may be determined using long averages of accelerations. The sample period logic 230 determines how frequently the motion sensor logic 210 obtains data. In one embodiment, the sample period is preconfigured. In one embodiment, the sample period is adjusted based on the application(s) using the sensor data.

The accelerometer 220 periodically samples motion data. The long average logic 240 calculates an average of the acceleration data over the sample period. In one embodiment, the long average logic 240 calculates the average of the accelerations over a number of measurements, rather than over a time period. In one embodiment, the long average logic 240 calculates accelerations over 5 minutes. In one embodiment, the long average logic 240 calculates accelerations over 20 measurements.

In one embodiment, the acceleration data is sent to the glitch correcting logic 235, where the data is analyzed to determine if any it represents a glitch, i.e., data outside a pre-determined range of acceptable data. For example, it is extremely unlikely if not impossible for motion data to go from zero acceleration to 10 m/s acceleration in one reading. In one embodiment, the pre-determined range of data is a predetermine change in acceleration from a current acceleration. For example, if the device is idle—e.g. not moving—the range of accelerations possible for the device is fairly limited. In one embodiment, glitch correcting logic 235 further may be used to discard non-human motions. For example, if the device is not being used but is in a moving vehicle, in one embodiment the vehicle's motion can be discarded as not fitting the signature of human motion.

In one embodiment, the glitch correcting logic 235 discards any abnormal accelerometer reading(s). In one embodiment, the non-glitch data is then passed on to the long average logic 240. In another embodiment, the glitch data is from the long average by glitch correcting logic 235. In one embodiment, if a certain number of glitch data points have been discarded, glitch notifier logic 237 notifies the user. In one embodiment, glitch notifier logic 237 may also notify the manufacturer. The glitches generally are indicative that the accelerometer or sensor is malfunctioning.

The long average logic 240 calculates one or more long averages of acceleration based on the received motion data. In one embodiment, the long average logic 240 utilizes a ring buffer memory 250, discarding older data as new data is added to the long average. In one embodiment, the long average logic 240 creates a long average of accelerations along a single axis. In one embodiment, the dominant axis—defined as the axis most impacted by gravity—is used by the long average logic 240. In one embodiment, the axis corresponds to one of the axes of the accelerometer. In one embodiment, the axis is defined as the orientation experiencing the most pull from gravity. In one embodiment, the long average logic 240 creates long averages of accelerations along multiple axes.

Determining the orientation of an electronic device may include identifying a gravitational influence. The axis with the largest absolute long average may be the axis most influenced by gravity, which may change over time (e.g., as the electronic device is rotated). Therefore, a new dominant axis may be assigned when the orientation of the electronic device and/or the inertial sensor(s) attached to or embedded in the electronic device changes.

In one embodiment, the actual axis with the largest absolute long average over a sample period is assigned as the dominant axis. In alternative embodiment, the dominant axis does not correspond to one of the actual axes of the inertial sensor(s) in a current orientation, but rather to an axis that is defined as approximately aligned to gravity. In one embodiment, the dominant axis corresponds to a virtual axis that is a component of a virtual coordinate system. In one embodiment, a true gravity assessment, such as by doing trigonometric calculations on the actual axes based on the gravitational influence is performed to determine orientation.

In one embodiment, a long average of accelerations is computed by the long average logic 240 when the device goes into idle state after a period of inactivity. In one embodiment, the long average and the dominant axis for which it is computed are received by computation logic 255. The computation logic 255 also receives, based on a new sample of motion data, a current dominant axis and an updated current long average for the current dominant axis.

If the prior and current dominant axes are the same, the computation logic 255 determines if the long average has changed by more than a predetermined threshold. In one embodiment, when the change in the dominant axis is larger than the threshold value, the computation logic 255 communicates with the power logic 265 and the device state logic 270, to power up the device and restore the last active device state. If the change in the dominant axis is not larger than the threshold value, the device is maintained in the idle state.

In one embodiment, if the new dominant axis is different from the prior dominant axis, the computation logic 255 communicates with the power logic 265 and configuration logic 260 to restore the device to the last active device state.

Figure 3:
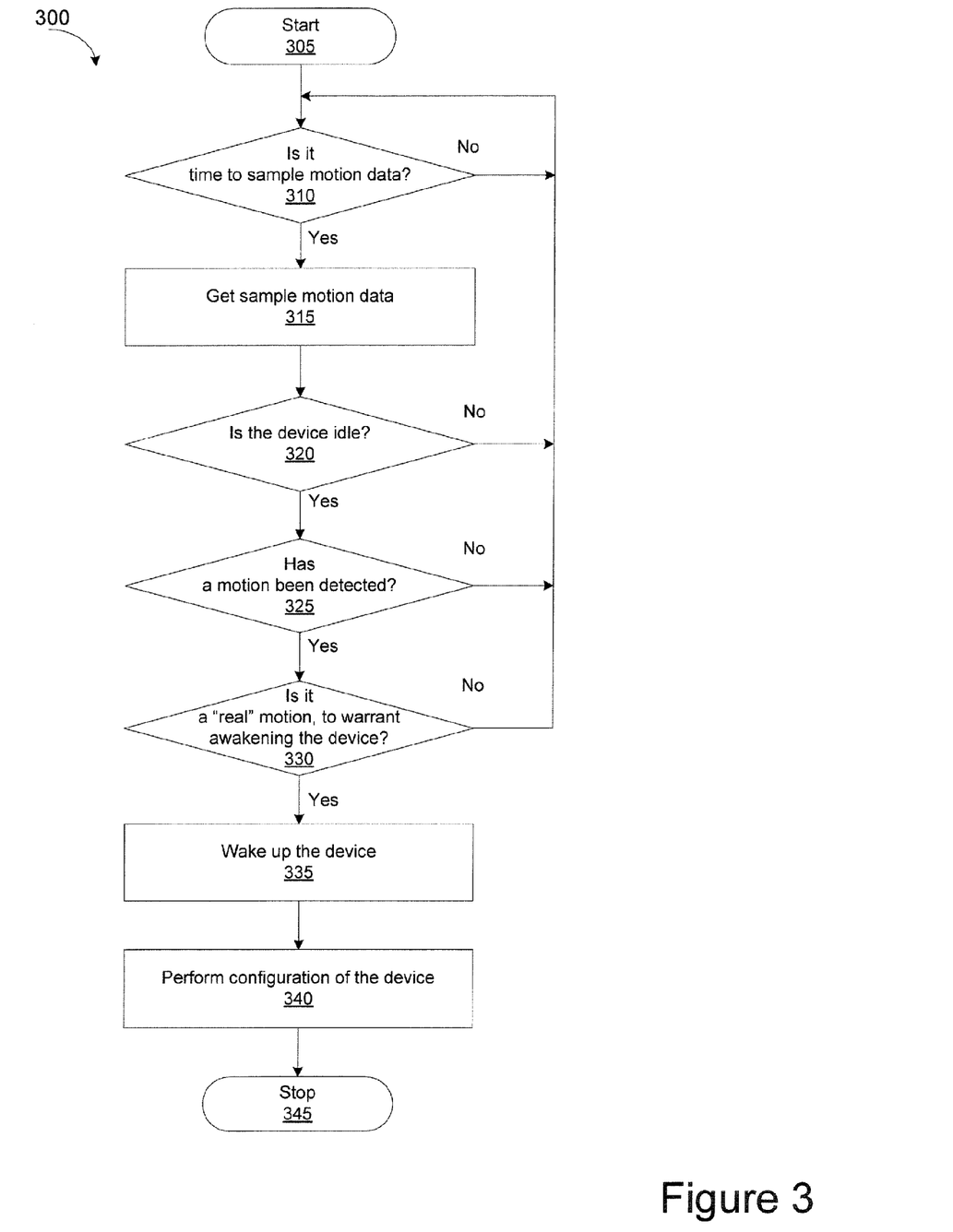
FIG. 3 is a flowchart of one embodiment of determining whether to wake up a device based on motion data.

FIG. 3 is a flowchart of one embodiment of determining whether to wake up a device based on motion data. At block 305, the process starts. In one embodiment, the process runs continuously. In one embodiment, the user may initiate the auto-wake-up system, or set a preference to have the auto-wake-up system on.

At block 310, the process determines if it is time to sample motion data. In one embodiment, the motion data is sampled periodically. If it is time to sample motion data, the process continues to block 315. Otherwise, the process returns block 310.

At block 315, the process gets sample motion data. In one embodiment, based on the sample motion data, at least one current/updated long average of accelerations is calculated. In one embodiment, the long average is based on a preset number of measurements, or on a preset time. The process continues to block 320.

At block 320, the process determines whether the device is in idle state. In one embodiment, the device is placed in idle state after the device has been inactive for a period of time. Inactive, in one embodiment, means that the device is not moving and that there are no user-interactive applications active on the device. In one embodiment, when the device is placed in idle state, a long average is initialized. If the device is not in idle state, the process returns to block 310. If the process determines that the device is in idle state, the process continues to block 325.

At block 325, the process determines if the device has experienced any motion, e.g. there is a difference between the readings of the accelerometer that are larger than a minimum threshold. In one embodiment, this determination is made by using a filter to remove accelerometer motions below the minimum threshold. If the process determines that no motion has been detected, the process returns to block 310. If the process determines that the accelerometer data indicates a movement of the device, the process continues to block 330.

At block 330, the process determines if the movement is a "real" motion and not a mere jostle or bump. The device may move, for example, as a result of a little jostle of a desk or table on which the device is laying, a heavy step nearby, or something else that creates a very small motion, but which does not warrant waking up the device. In contrast, the device may move as a result of being picked up by a user intending to use the device. In this case, the movement is a "real" motion which warrants awakening the device.

If the motion is not a "real" motion, the process returns to block 310. If the movement is a "real" motion, the process continues to block 335. At block 335, the process wakes up the device. The process continues to block 340.

At block 340, the process in one embodiment configures the device to restore the last device state when the device was active. In one embodiment, the system allows the user to customize the wake-up restoration of the device. For example, the user may customize the system not to start the previously-active applications, but to present a home screen. The process then ends.

Figure 4:
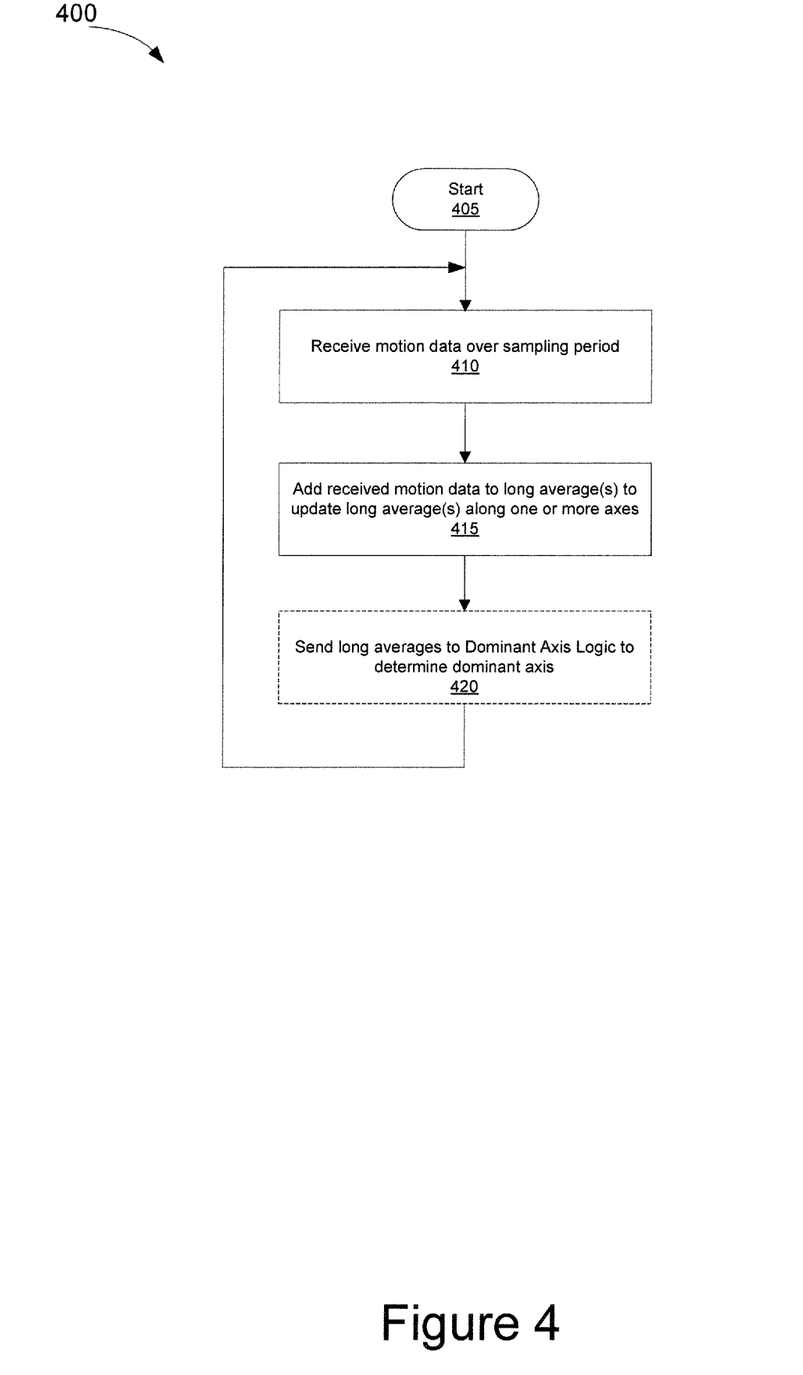
FIG. 4 is a flowchart of one embodiment of a process to create a long average of accelerations.

FIG. 4 is a flowchart of one embodiment of a process to create a long average of accelerations. The process 400 starts at block 405. In one embodiment, this process is continuously running when the device is powered.

At block 410, the long average logic, in one embodiment, receives motion data from the accelerometer. In one embodiment, the long average logic receives the data from a glitch correcting logic which removes abnormal data from the motion data before the motion data is passed to the long average logic. The process continues to block 415.

At block 415, the long average logic adds the sampled motion data to the long average, to create an updated long average of accelerations. In embodiment, the long average logic maintains a long average only for the dominant axis (e.g., the axis on which the gravitational effect is detected). In another embodiment, the long average logic maintains an average for one or more axes. The process continues to block 420.

At block 420, the long average logic, in one embodiment, optionally sends the long averages of accelerations for a plurality of axes to the dominant axis logic for determination of the dominant axis. In an alternative embodiment, the dominant axis logic retrieves the long averages of accelerations for a plurality of axes from memory to determine the dominant axis. The process then returns to block 410, to continue receiving motion data.

Figure 5:
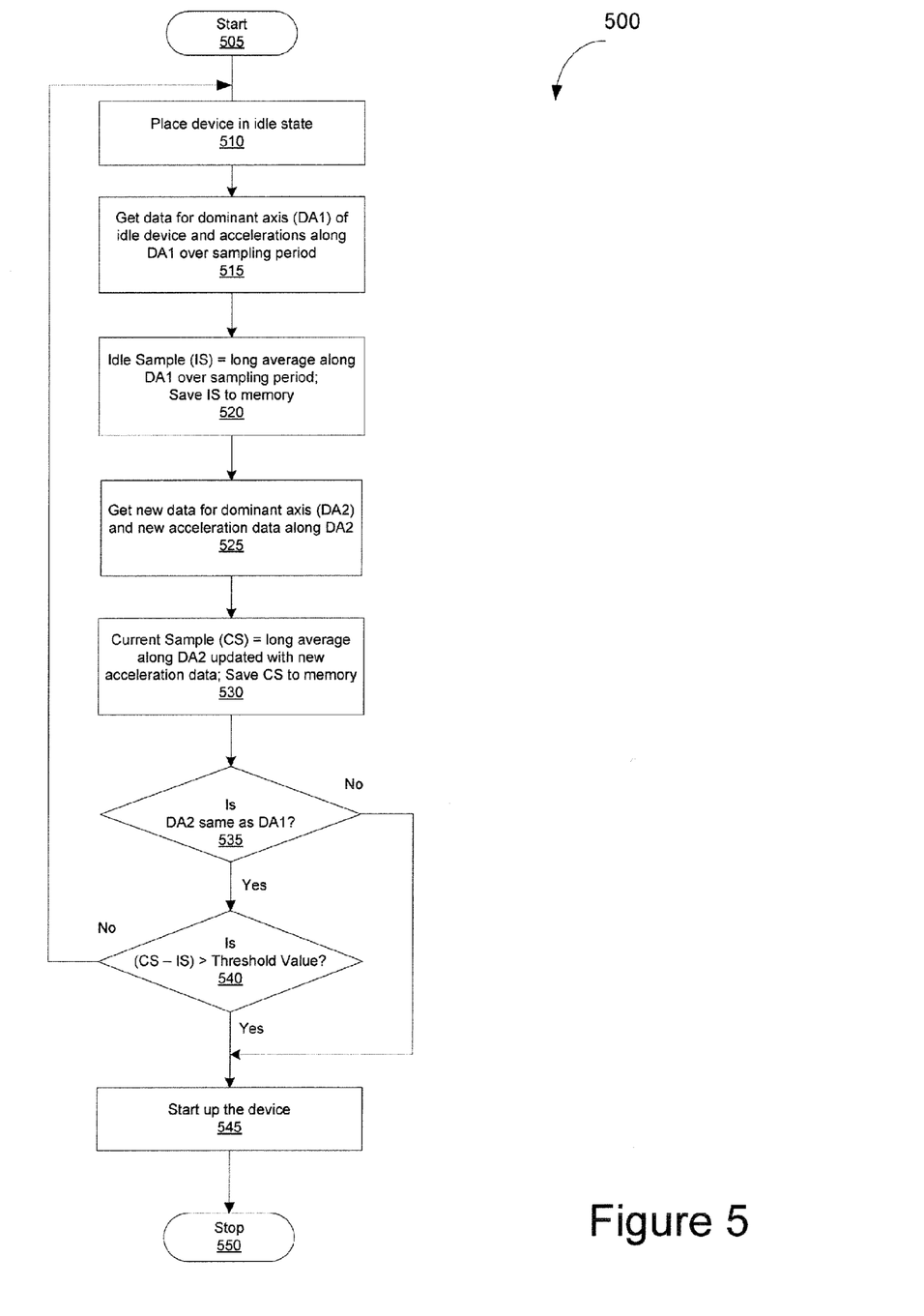
FIG. 5 is a flowchart of one embodiment of a process for determining whether a device should be woken up from an idle state.

FIG. 5 is a flowchart of one embodiment of a process 500 for determining whether a device should be woken up from an idle state. The process starts at block 505. In one embodiment, the process is activated when a preset period with no motion has been detected.

At block 510, the process places the device in idle state after the device has been inactive for a period of time. The process continues to block 515.

At block 515, the computation logic receives data for the dominant axis DA1 of the idle device and accelerations along DA1 over a sampling period, computed by the long average logic after the device becomes idle. The process continues to block 520.

At block 520, the computation logic assigns the long average of accelerations along DA1 over a period to Idle Sample (IS). In one embodiment, IS is saved to memory. The process continues to block 525.

At block 525, the process receives new dominant axis data DA2 and the new acceleration data along DA2. The process continues to block 530.

At block 530, the computation logic adds the new data to the long average of accelerations along DA2 to generate a Current Sample (CS). Also at block 530, in one embodiment, the computation logic saves CS to memory. The process continues to block 535.

At block 535, the computation logic compares the idle dominant axis DA1 with the current dominant axis DA2. If the current dominant axis DA2 is different from the idle dominant axis DA1, the process continues to block 545. In one embodiment, the comparison is within a range, e.g. a minimum change of one degree has to occur to identify DA2 as being different from DA1. In one embodiment, if the dominant axis has changed, then the orientation of the device has changed, and that warrants waking up the device. If DA2 is substantially the same as DA1, then the computation logic continues to block 540.

At block 540, the computation logic determines if the long average along the dominant axis has changed by more than a threshold value, i.e., if the difference between the Current Sample value and the Idle Sample value is larger than the threshold value. In one embodiment, the threshold value is set to 30, which is approximately a $10^{th}$ of a g. If the difference between IS and CS is less than the threshold value, the process returns to block 510, to continue monitoring the idle state. CS becomes IS, for the next calculation.

If the computation logic determines that the change in the long average of accelerations along the dominant axis is greater than the threshold, then the computation logic continues to block 545. At block 545, the computation logic communicates with the power logic of the configuration logic to start up the device. The process then ends.

Figure 6:
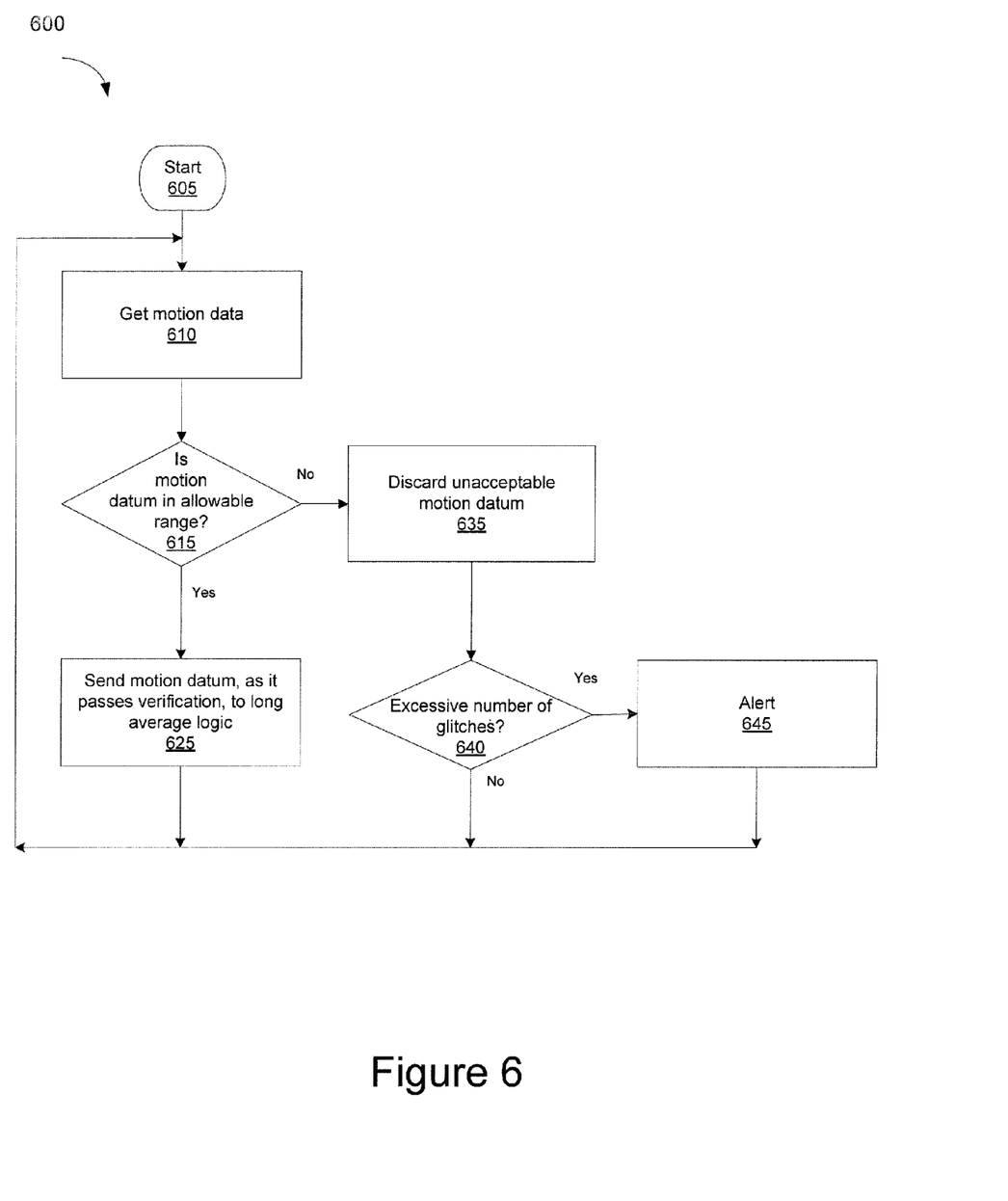
FIG. 6 is a flowchart of one embodiment of a process to detect and correct glitches in motion data.

FIG. 6 is a flowchart of an embodiment of a process 600 to detect and correct glitches in motion data. In one embodiment, this process is always active. In one embodiment, this process is active when the device is in the idle state. In one embodiment, the glitch correction takes place before the motion data is added to the long average. The process starts at block 605.

At block 610, the glitch correcting logic receives motion data from an accelerometer.

At block 615, the glitch correcting logic determines if the received motion data contains a glitch. In one embodiment, a glitch is a datum that indicates a motion outside an acceptable range. For example, it is extremely unlikely that a device would go from idle (e.g., no motion) to moving at an acceleration of 64 feet per second squared (equivalent to 2 g). The correcting logic examines each datum against a range of acceptable data to determine if the datum falls within this range and, therefore, should be used in calculating the long average of accelerations. In one embodiment, the glitch correction logic utilizes the change in acceleration between two readings to determine whether there is a glitch.

If the glitch correcting logic determines that the motion data is not a glitch, the glitch correcting logic continues to block 625.

At block 625, the glitch correcting logic sends the motion data to the long average logic. The process then returns to block 610, to continue monitoring the acceleration data.

If at block 615, the glitch correcting logic determines that the motion data is outside the allowable range, the glitch correcting logic continues to block 635.

At block 635, the glitch correcting logic discards the unacceptable motion data. At block 640, the process determines whether there have been an excessive number of glitches. In one embodiment, the glitch correcting logic uses the motion data to detect a possible problem with the accelerometer. In one embodiment, an excessive number of glitches may indicate a problem with the accelerometer. If the process determines that there have been an excessive number of glitches, the process, at block 645, generates an alert regarding the problem. In one embodiment, the alert may be a message to alert the user of the device. In one embodiment, the alert may be a notification to one or more recipients via a network connection. For example, the system may notify a service provider, manufacturer, or other appropriate notification target.

The process then returns to block 610, to continue monitoring the acceleration data.

Figure 7:
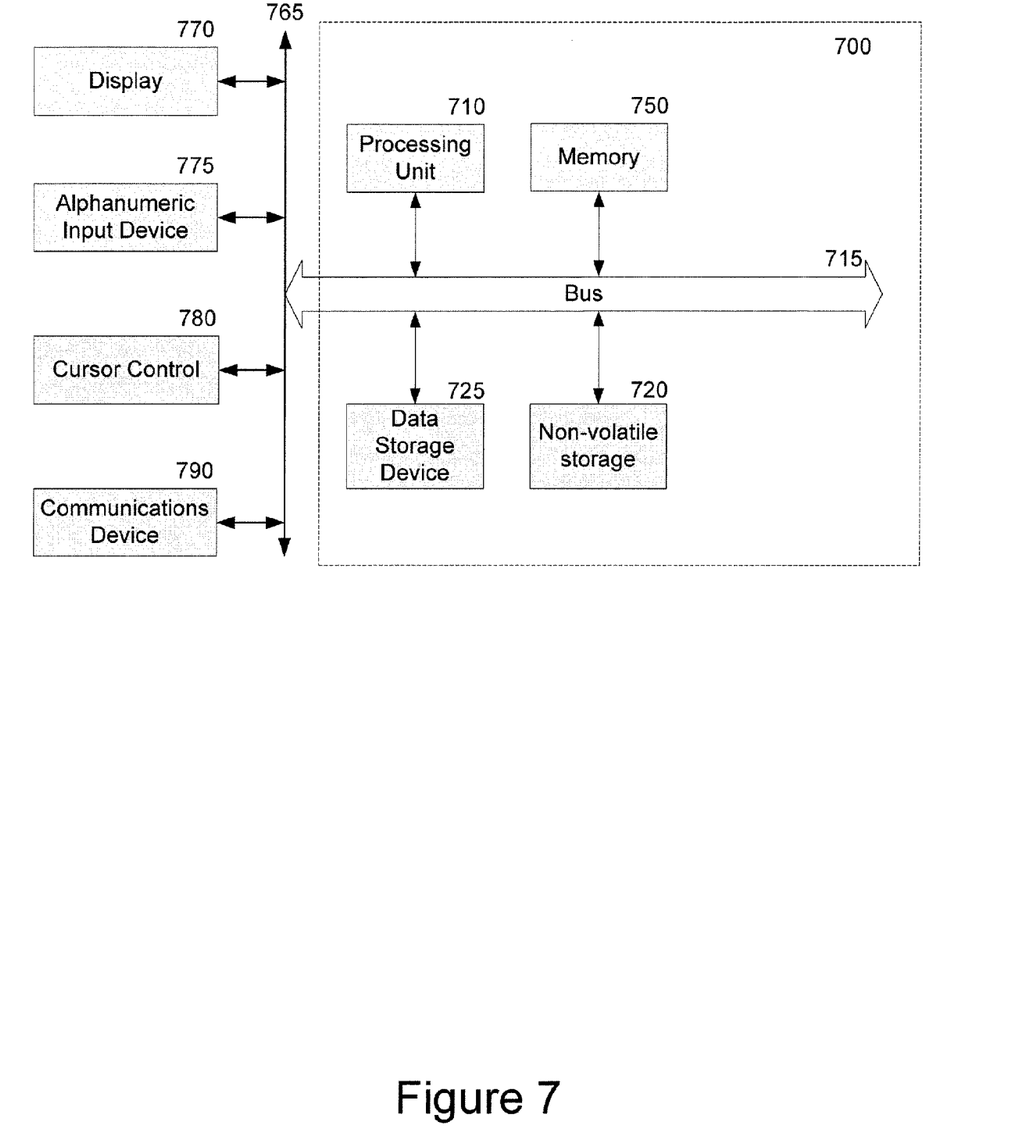
FIG. 7 is a block diagram of one embodiment of a computer system that may be used with the present invention.

FIG. 7 is a block diagram of one embodiment of a computer system that may be used with the present invention. It will be apparent to those of ordinary skill in the art, however that other alternative systems of various system architectures may also be used. The computer system may include a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. In one embodiment, the system also comprises a read only memory (ROM) and/or static storage device 720 coupled to bus 715 for storing static information and instructions for processor 710, and a data storage device 725 such as a flash memory, magnetic disk, optical disk and its corresponding disk drive. Data storage device 725 is coupled to bus 715 for storing information and instructions.

The system may include various input/output devices, such as a screen, audio output, keyboard, button, mouse, etc. These I/O devices may also be coupled to bus 715 through bus 765 for communicating information and command selections to processor 710. Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, a wireless connection mechanism, or any other mechanism that provides connectivity between the computer system 700 and the outside world. Note that any or all of the components of this system and associated hardware may be used in various embodiments of the present invention. It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 710. A machine-readable medium includes any mechanism for storing or transmitting information in a form readable by a machine (e.g., a computer). For example, a machine readable medium includes read-only memory (ROM), random access memory (RAM), magnetic disk storage media, optical storage media, flash memory devices. In one embodiment, the system may be embodied in a signal, such as an electrical, optical, acoustical or other forms of propagated signal (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving motion data from a motion sensor in a device, the motion sensor sensing motion along three axes;
   verifying whether the motion data includes one or more glitches and removing the one or more glitches from the motion data;
   determining an idle sample value for a dominant axis of the device, the dominant axis defined as the axis with a largest effect from gravity among the three axes, the idle sample value comprising an average of accelerations over a sample period along the dominant axis recorded when the device goes to idle mode after a period of inactivity;
   registering a motion of the device based on the motion data from the motion sensor;
   determining whether the motion caused a change in the dominant axis; and
   waking up the device when the motion of the device indicates the change in the dominant axis of the device, the dominant axis being the axis with the largest effect from gravity among the three axes.

2. The method of claim 1, wherein determining the idle sample value for the dominant axis comprises:
   processing the motion data to establish the idle sample value; and
   processing the idle sample value to establish the dominant axis.

3. The method of claim 1, wherein the motion sensor comprises an accelerometer.

4. The method of claim 2, further comprising determining the idle sample value for each of the other axes of the device.

5. The method of claim 1, wherein registering the motion of the device comprises:
   processing the motion data to determine a current sample value along the dominant axis of the device.

6. The method of claim 5, further comprising comparing a difference between a current sample value along the dominant axis determined based on the motion of the device and the idle sample value of the dominant axis against a threshold value.

7. The method of claim 1, wherein the change in the dominant axis comprises a change in acceleration along the dominant axis.

8. The method of claim 1, wherein waking up the device further comprises configuring the device to return to a last active device state.

9. The method of claim 5, wherein the current sample value of the dominant axis of the device is an average of accelerations over a sample period.

10. The method of claim 5, further comprising determining the current sample value for each of the other axes of the device.

11. The method of claim 5, further comprising determining that the device is to be woken up based on the difference between the current sample value and the idle sample value being greater than a threshold value.

12. The method of claim 7, further comprising:
determining a new dominant axis based on the motion data received from the motion sensor;
computing a difference between the current sample value along the new dominant axis and an idle sample value along the new dominant axis determined when the device goes to idle mode after a period of inactivity; and
comparing the difference against a threshold value to establish whether to wake the device up.

13. A mobile device comprising:
a motion sensor to sense motion along three axes and generate motion data;
a glitch corrector to determine whether the motion data includes one or more glitches and removing the one or more glitches from the motion data;
a dominant axis logic to determine an idle sample value for a dominant axis of the mobile device based on the motion data, the dominant axis defined as an axis with a largest effect from gravity among three axes, and the idle sample value comprising an average of accelerations over a sample period along the dominant axis recorded when the device goes to idle mode after a period of inactivity;
a computation logic to determine whether the motion caused a change in the dominant axis; and
a power logic to wake up the device when the motion of the device indicates a change in the dominant axis of the device, the dominant axis being the axis with the largest effect from gravity among the three axes.

14. The mobile device of claim 13, further comprising:
a long average logic to calculate an average of accelerations over a sample period.

15. The mobile device of claim 14, further comprising:
the dominant axis logic further to compare a difference between a current sample value along the dominant axis determined based on the motion of the device and the idle sample value of the dominant axis against a threshold value.

16. The mobile device of claim 14, wherein waking up the device further comprises configuring the device to return to a last active device state.

17. The mobile device of claim 13, wherein the motion sensor logic comprises an accelerometer to detect acceleration along one or more axes.

18. The mobile device of claim 13, further comprising a device state logic to restore the device to a last active state.

19. The mobile device of claim 18, wherein the device state logic allows user interaction to customize applications to be displayed when the device is woken up.

20. A system to wake up a mobile device comprising:
a motion sensor to detect motion along three axes and generation motion data;
a glitch corrector to determine whether the motion data includes one or more glitches and remove the one or more glitches from the motion data;
a dominant axis logic to determine an idle sample value, comprising an average of accelerations over a sample period along a dominant axis, the dominant axis defined as an axis with a largest effect of gravity among the three axes; and
a power logic to move the device from the inactive state to an active state upon detection of a change in the dominant axis which is the axis experiencing the largest effect of gravity.

21. The system of claim 20, further comprising:
a long average logic to calculate an average of accelerations over a sample period, for accelerations along the dominant axis; and
a computation logic to determine if the average of accelerations indicates the change in the dominant axis of the device.

22. The system of claim 20, further comprising:
a device state logic to restore the device to one of: a last active state, a preset customized state.

* * * * *

(12) INTER PARTES REVIEW CERTIFICATE (2480th)
United States Patent (10) Number: US 8,872,646 K1
Kahn et al. (45) Certificate Issued: Nov. 1, 2021

(54) METHOD AND SYSTEM FOR WAKING UP A DEVICE DUE TO MOTION

(75) Inventors: Philippe Kahn; Arthur Kinsolving; Mark Andrew Christensen; David Vogel

(73) Assignee: UNILOC LUXEMBOURG S.A.

Trial Numbers:

IPR2018-00289 filed Dec. 8, 2017
IPR2018-01383 filed Jul. 11, 2018
IPR2018-01664 filed Sep. 6, 2018

Inter Partes Review Certificate for:

Patent No.: 8,872,646
Issued: Oct. 28, 2014
Appl. No.: 12/247,950
Filed: Oct. 8, 2008

The results of IPR2018-00289 joined with IPR2018-01383; IPR2018-01664 are reflected in this inter partes review certificate under 35 U.S.C. 318(b).

INTER PARTES REVIEW CERTIFICATE
U.S. Patent 8,872,646 K1
Trial No. IPR2018-00289
Certificate Issued Nov. 1, 2021

AS A RESULT OF THE INTER PARTES REVIEW PROCEEDING, IT HAS BEEN DETERMINED THAT:

Claims 1, 3, 5-11, 13-18, 20 and 22 are cancelled.

\* \* \* \* \*